United States Patent [19]

Armstrong et al.

[11] Patent Number: 4,771,223
[45] Date of Patent: Sep. 13, 1988

[54] MOTOR SPEED CONTROL SYSTEM

[75] Inventors: Desmond R. Armstrong, Wallington; Philip H. Bird, Potters Bar, both of England

[73] Assignee: U.S. Philips Corporation, New York, N.Y.

[21] Appl. No.: 40,910

[22] Filed: Apr. 21, 1987

[30] Foreign Application Priority Data

Apr. 30, 1986 [GB] United Kingdom ................ 8610565

[51] Int. Cl.⁴ .............................................. H02P 5/40
[52] U.S. Cl. .................................... 318/809; 318/314; 318/318; 318/341; 318/345 E
[58] Field of Search ............... 363/137, 138; 318/341, 318/345 E, 809, 314, 318

[56] References Cited

U.S. PATENT DOCUMENTS

| | | | |
|---|---|---|---|
| 3,110,853 | 11/1963 | Jones | 318/312 |
| 4,201,936 | 5/1980 | Roumanis | 318/341 |
| 4,584,507 | 4/1986 | Taylor | 318/341 |

Primary Examiner—David Smith, Jr.
Attorney, Agent, or Firm—Thomas A. Briody; David R. Treacy; Bernard Franzblau

[57] ABSTRACT

A speed control system for an a.c. electric motor (1) comprises a microcomputer (6) having an interrupt signal input (INT/TO) to which is coupled the outputs of a detector (10) for detecting zero-crossings of the a.c. supply voltage and a tachogenerator (11) driven by the motor. The microcomputer supplies firing pulses to a triac (2), connected in series with the motor, in response to an overflow of a clocked counter (CT). This counter is suitably preloaded at each zero-crossing. The counter is read each time a tachogenerator pulse occurs and the time which this reading indicates has elapsed since the immediately preceding zero-crossing is stored. A record is also kept in a register (ZCSLTA) of how many zero-crossings occur between each tachogenerator pulse and the next and from this, and the stored times relating to the relevant pulses, the period of the tachogenerator pulses and hence the actual speed of the motor is calculated. The preloading value for the counter is calculated from this and the required speed.

5 Claims, 3 Drawing Sheets

MOTOR SPEED CONTROL SYSTEM

BACKGROUND OF THE INVENTION

This invention relates to a speed control system for an a.c. electric motor which is connected in series with a controllable switch between first and second a.c. supply conductors, the system comprises a data processing system comprising a program store and a digital data processor for performing a program of processing operations on digital data in accordance with program data contained in said program store, the processing system has an output coupled to a control input of said switch, a detector for zero potential between said supply conductors, which detector has an input coupled to said supply conductors and an output coupled to an input of said data processing system for generating an output signal when zero potential occurs between said supply conductors, a tachogenerator having an input coupled to said motor and an output coupled to an interrupt signal input of said data processing system, and a counter having an input coupled to an output of a clock signal source and an output coupled to an interrupt signal input of said data processing system for generating an output signal when count therein, reaches a predetermined value. The program comprises a cyclic main program and first and second interrupt routines which are arranged to be performed in response to the generation of an output signal by said tachogenerator and in response to the count in said counter reaching said predetermined value respectively.

Such systems have to perform three main functions, namely (i) determine the period of the tachogenerator output signals and hence the actual speed of the motor, (ii) calculate the delay time or firing period from each zero-crossing in the a.c. supply after which the switch is required to conduct (often referred to as the "firing angle") and time this delay, and (iii) cause the switch to conduct at the end of the time delay.

Due to the overlapping timing requirements of the tachogenerator signal period and of the firing angle, and the arbitrary nature of the relationship between the instants determining the two timing periods, it is known to use a first counter/timer for measuring the tachogenerator period and a second counter/timer for generating the firing angle time delay. U.S. Pat. No. 4,584,504 discloses a system of the kind defined in the first paragraph which enables one of these two timer/counters to be dispensed with. In this known system the main program is arranged to be synchronised with the output signals generated by the detector, each cycle occupying a time which is less than that which elapses between two successive such output signals and a wait occurring until each such output signal occurs. This is wasteful of potential processing time in the main program and it is an object of the present invention to remove the necessity for such waiting periods. Moreover, the processing in the known system is quite complicated and it is a further object of the present invention to enable this processing to be simplified.

SUMMARY OF THE INVENTION

Accordingly, the invention provides a speed control system for an a.c. electric motor which is connected in series with a controllable switch between first and second a.c. supply conductors, which system comprises a data processing system comprising a program store and a digital data processor for performing a program of processing operations on digital data in accordance with program data contained in said program store, which processing system has an output coupled to a control input of said switch, a detector for zero potential between said supply conductors, which detector has an input coupled to said supply conductors and an output coupled to an input of said data processing system for generating an output signal when zero potential occurs between said supply conductors, a tachogenerator having an input coupled to said motor and an output coupled to an interrupt signal input of said data processing system, and a counter having an input coupled to an output of a clock signal source and an output coupled to an interrupt signal input of said data processing system for generating an output signal when the count therein reaches a predetermined value, said program comprising a cyclic main program and first and second interrupt routines which are arranged to be performed in response to the generation of an output signal by said tachogenerator and in response to the count in said counter reaching said predetermined value respectively, characterised in that the detector output is coupled to an interrupt signal input of said data processing system, in that said program comprises a further interrupt routine which is arranged to be performed in response to the generation of an output signal by said detector, in that said data processing system includes first storage means for storing a digital representation, in terms of a number of counts of the counter, of the time after the generation of an interrupt signal by said detector at which the switch is required to conduct, second storage means for a digital representation of the number of output signals which have been generated by said detector since a preceding output signal generated by the tachogenerator occurred, and third and fourth storage means each for a digital representation of a respective time which has elapsed between the generation of an output signal by the detector and the subsequent generation of an output signal by the tachogenerator, or for information from which this time can be calculated, the said third interrupt routine comprising the steps of (a) loading the counter with a value such that the count therein will next reach said predetermined value when the switch is required to conduct, which loading value is derived from the first storage means, and (b) updating the contents of the second storage means, the said second interrupt routine comprising the step of (c) generating at the said output of the processing system a conduct control signal for the switch, the said first interrupt routine comprising, at least some times it is performed, the steps of (d) reading the contents of the counter and storing in one of the third and fourth storage means a digital representation, derived from the contents thus read and the value with which the counter was loaded when the immediately preceding output signal was generated by the detector, of the time which has elapsed since the generation of an output signal by the detector, or of information from which this time can be calculated, so that after each performance of this step one of the third and fourth storage means will have stored therein the result of said performance and the other of the third and fourth storage means will have stored therein the result of the immediately preceding performance of this step, and (e) saving and resetting the contents of the second storage means, the main program comprising, at least some times it is performed, the steps of (f) calculating from the contents of the third and fourth storage means and the quantity saved in the last step (e) the period of the output signals generated by the tachogenerator, (g) calculating from at least this period and a quantity representative of the required motor speed a quantity representative, in terms of a number of counts of the counter, of the time after the generation of an output signal by the detector at which the switch is required to conduct, and (h) storing the calculated result in the first storage means.

It has now been recognized that interaction between various interrupt routines need not unduly perturb the operation of a speed control system provided that these routines are kept relatively short. Thus, provided that this is so, generation of an output signal by the detector may itself be arranged to initiate an interrupt routine, thereby removing the necessity of providing the waiting periods created in the known system. It has been found that processing the data in the manner specified can be relatively simple and can enable the interrupt routines to be kept sufficiently short.

Some single-chip microcomputers, e.g. those of the MAB8400 family available from Mullard Ltd., U.K. have a single counter/timer on-chip, this being clocked by the source which also controls the actual microcomputer, and generating an interrupt each time it overflows. Such overflows normally occur several times during each half-cycle of the a.c. public electricity supply. In order to enable this counter/timer to be utilised for the purposes of the aforesaid counter the aforesaid counter may comprise a first portion which is arranged to generate a signal at an output thereof each time this portion overflows, which output constitutes the output of the counter which is coupled to an interrupt signal input of the data processing system, and a second portion constituted by further storage means for a digital representation of the number of output signals which have been generated by overflow of the first portion since the last output signal generated by the detector occurred, the digital representation stored by the first storage means may be arranged to be in terms of a whole number of complete cycle periods of said first portion plus a fraction of a second complete cycle period, step (a) may comprise loading the first portion with a value such that it will next overflow after a period of time equal to the said fraction of a complete cycle period and resetting the content of the further storage means, and the second interrupt routine may constitute a branch of a larger interrupt routine which is arranged to be performed in response to each overflow of the said first portion, which larger interrupt routine includes the steps of initiating the second interrupt routine if exactly said whole number of complete cycle periods of said first portion have occurred since the first overflow of said first portion after the last output signal was generated by the detector, and updating the content of the further storage means.

BRIEF DESCRIPTION OF THE DRAWINGS

Embodiments of the invention will now be described, by way of example, with reference to the accompanying diagrammatic drawings in which.

DESCRIPTION OF THE PREFERRED EMBODIMENTS

Figure 1:
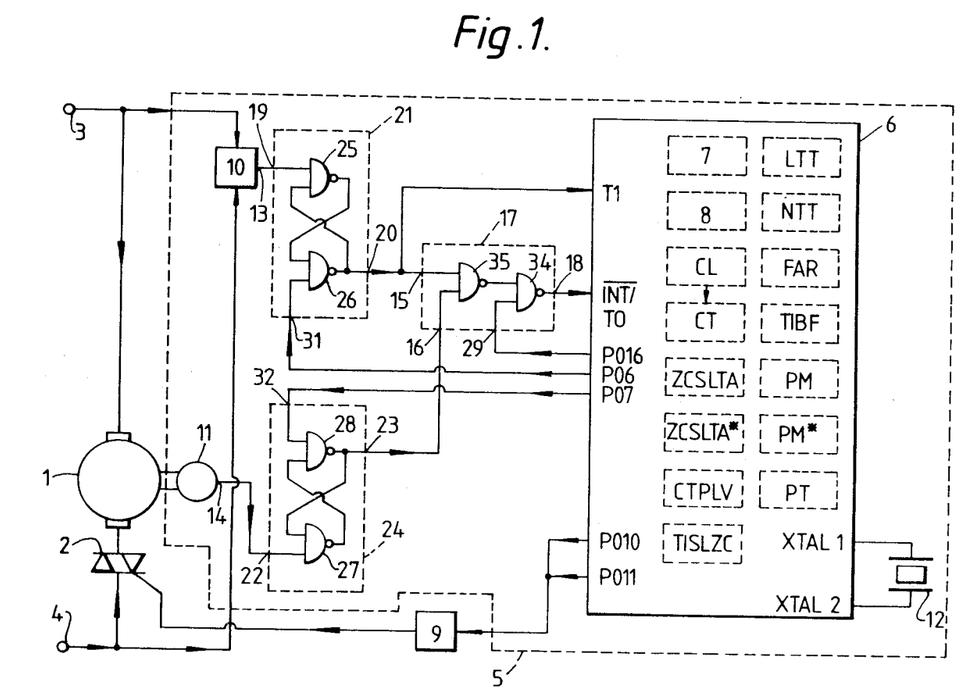
FIG. 1 is a diagram of an a.c. electric motor speed control system embodying the invention.

In FIG. 1 a speed control system for an a.c. electric motor 1 which is connected in series with a controllable switch 2 in the form of a triac between first and second a.c. supply conductors 3 and 4 comprises a data processing system 5. System 5 includes a single-chip microcomputer 6 which in conventional manner comprises a program store 7 and a digital data processor 8 for performing a program of processing operations on digital data in accordance with program data contained in the store 7. This program will be described more fully below. Microcomputer 6 is, in the present example, a member of the MAB 8400 family available from Mullard Ltd., U.K., and in consequence has but a single interrupt signal input $\overline{INT}/TO$. Only those connections between microcomputer 6 and the exterior which are particularly relevant to the following description are shown. The microcomputer 6 includes internally first, second, third, fourth and fifth storage means in the form of registers FAR, ZCSLTA, TISLTA, NTT and LTT respectively, further storage means in the form of registers ZCSLTA*, CTPLV, TIBF, PM*, PT and PM respectively, and an 8-bit timer/counter CT which is driven by an internal clock CL the frequency of which is determined by an external crystal resonator 12 connected between pins XTAL 1 and XTAL 2 of the microcomputer 6. The clock CL also controls the overall operation of the microcomputer, with the result that counter CT is clocked once every machine cycle performed by the microcomputer. Each time the content of counter CT corresponds to its maximum count and receives a further clock pulse, i.e. overflows, it resets and generates an internal interrupt signal.

Control of the speed of the motor 1 is effected by controlling the firing angle of triac 2, i.e. the instant in each half-cycle of the a.c. supply fed to the conductors 3 and 4 at which the triac 2 is fired, these instants being made earlier in the half cycles (corresponding to a larger firing angle) if the actual motor speed is less than a target speed a digital representation of which is stored in the register PT in microcomputer 6, and being made later in the half-cycles (corresponding to a smaller firing angle) if the actual speed is greater than the target speed. The trigger pulses for the triac 2 are generated by microcomputer 6 at the correct instants at a pair of parallel-connected output port pins P010 and P011 and are fed to the triac gate via an amplifier 9. Obviously, in order to generate these trigger pulses at the correct instants the microcomputer 6 needs information about when each zero crossing occurs in the supply voltage fed to the conductors 3 and 4, i.e. when each half-cycle starts, also about the actual speed of the motor 1. Accordingly the system 5 also includes first and second interrupt signal sources in the form of a detector 10 for detecting zero potential between the conductors 3 and 4, and a tachogenerator 11 driven by the motor 1. In the quiescent state each of these sources produces a logic "1" at its output, source 10 producing a logic "0" pulse each time the voltage between conductors 3 and 4 reaches zero and source 11 producing logic "0" pulses at a rate which is directly proportional to the speed of the motor 1. (Source 10 may comprise a pair of voltage comparators for detecting the presence on one of the conductors 3 and 4 of a potential less than a very small positive and negative potential respectively relative to the other, the outputs of which comparators are combined by means of a NAND function). Each of these logic "0" pulses initiates an interrupt routine in the microcomputer 6, this routine comprising first and second branches, the first being taken in response to a logic "0" pulse from zero crossing detector 10 and the second being taken in response to a logic "0" pulse from tachogenerator 11. The outputs 13 and 14 of the sources 10 and 11 are coupled to respective inputs 15 and 16 of an OR-function circuit 17 the output 18 of which is connected to the interrupt signal input INT/TO of microcomputer 6. The coupling from output 13 to input 15 is via the set input 19 and the output 20 of a bistable device 21, and the coupling from output 14 to input 16 is via the set input 22 and the output 23 of a bistable device 24. Device 21 comprises in known manner two cross-coupled NAND-gates 25 and 26, and device 24 similarly comprises two cross-coupled NAND-gates 27 and 28. OR-function circuit 17 also has an override signal input 29 which is connected to a further output port pin PO16 of microcomputer 6. Two further output port pins PO6 and PO7 of microcomputer 6 are connected to reset inputs 31 and 32 respectively of bistable devices 21 and 24 respectively. The output 20 of bistable device 1 is also connected to a test input pin T1 of microcomputer 6.

The bistable devices 21 and 24 and the disable input 29 of OR-function circuit 17 are provided for the following reason. Microcomputer 6 responds, at its interrupt signal input $\overline{INT}$/TO, only to a signal transition from logic "1" to logic "0", and not to the mere presence thereat of logic "0". Because the logic "0" pulses from tachogenerator 11 can occur at any time during a cycle of the voltage supply fed to conductors 3 and 4 it is very possible that, at least occasionally, one of these will overlap a logic "0" pulse from zero-crossing detector 10. If the logic "0" signals at the outputs 13 and 14 of detector 10 and tachogenerator 11 were simply OR-ed together and applied to interrupt signal input $\overline{INT}$/TO, the result of this OR-ing operation would, for a pair of overlapping pulses, simply be a logic "0" pulse of extended length, i.e. only a single transition from logic "1" to logic "0" would occur at input $\overline{INT}$/TO so that microcomputer 6 would ignore one of the pulses from the sources 10 and 11. Because of the presence of the bistable devices 21 and 24, the override signal input 29, and the way in which the interrupt routine performed by microcomputer 6 in response to a transition at its input INT/TO from logic "1" to logic "0" is organised, however, the following in fact happens. Output pin PO16 is normally logic "1", this output pin being connected to one input of a NAND-gate 34 forming part of circuit 17. The other input of NAND-gate 34 is fed from the outputs 20 and 23 of devices 21 and 24 via a NAND-gate 35, also forming a part of circuit 17, so that if it is assumed that both devices initially produce a logic "1", a logic "0" subsequently produced by either of these devices (in response to a logic "0" pulse produced by the source 10 or the source 11) will result in the application of a signal transition from logic "1" to logic "0" to the interrupt signal input $\overline{INT}$/TO, and hence in the carrying out of an interrupt routine by microcomputer 6. This interrupt routine, an example of which will be described below, includes the following steps. First the signal state at test input T1 is ascertained. If it is logic "0" then bistable device 21 is in the set state, indicating that zero-crossing detector 10 has produced a logic "0" pulse, and a first branch of the interrupt routine is taken. If the signal state at test input T1 is logic "1" on the other hand, then tachogenerator 11 must have produced the logic "0" pulse which gave rise to the interrupt, and a second branch of the interrupt routine is taken in this case. At the end of the first branch microcomputer 6 generates a logic "0" pulse at its output PO6, resetting bistable device 21, and also generates a logic "0" pulse at its output PO16. Similarly, at the end of the second branch microcomputer 6 generates a logic "0" pulse at its output PO7, resetting bistable device 24, and also generates a logic "0" pulse at its output PO16. If only one of these bistable devices is in the set state when the reset occurs (because only one of the sources 10 and 11 has produced a logic "0" pulse) the signal level at interrupt signal input $\overline{INT}$/TO merely returns to logic "1" and remains there until one of the bistable devices 21 and 24 again assumes the set state. However, if both bistable devices 21 and 24 are in the set state when the resetting of one occurs (because both the zero-crossing detector 10 and the tachogenerator 11 have produced logic "0" pulses) the logic "0" pulse at the output PO16 still results in a transition from logic "0" to logic "1" at interrupt signal input $\overline{INT}$/TO but now, when this pulse ends, the signal level at input $\overline{INT}$/TO returns to logic "0" (because of the logic "0" level still present at one of the inputs 15 and 16 of circuit 17 and hence the logic "1" level still present at the output of gate 35) resulting in the interrupt routine being repeated, as required.

It will be noted that, because the test pin T1 is connected to the output of bistable device 21, if both the tachogenerator 11 and the mains zero crossing detector 10 produce a logic "0" pulse substantially simultaneously, the interrupt routine branch corresponding to the zero-crossing detector 10 will be performed before the branch corresponding to the tachogenerator 11. An alternative possibility is to connect the output 23 of device 24 to a further test input of microcomputer 6, for example another pin of the port PO, and to arrange that this and pin T1 are tested in the required order at the beginning of the interrupt routine. This would be necessary in any case if one or more further interrupt signal sources and associated bistable devices were provided connected to further respective inputs of NAND-gate 35, as it will be evident is possible. If such a further source and associated device is present microcomputer 6 will obviously have to be provided with a corresponding further output similar to PO6 and PO7 connected to the reset input of the further bistable device.

It will also be evident that it is alternatively possible to use the same pulse generated by microcomputer 6 both to reset the relevant bistable device 21 or 24 and to temporarily override the output signal of the OR-function circuit 17. Thus, for example, the connection from the output pin PO16 of microcomputer 6 to the lower input of gate 34 may be omitted, this lower input being fed instead from the output of a further two-input NAND-gate (not shown) provided in circuit 17 via an inverter, the inputs of this further NAND-gate being fed from the output pins PO6 and PO7 respectively. It will be appreciated that the resetting and overriding operations may or may not be concurrent, it merely being necessary that the overriding of the OR-function circuit output signal terminates after the relevant bistable device has been reset.

Figures 2, 4:
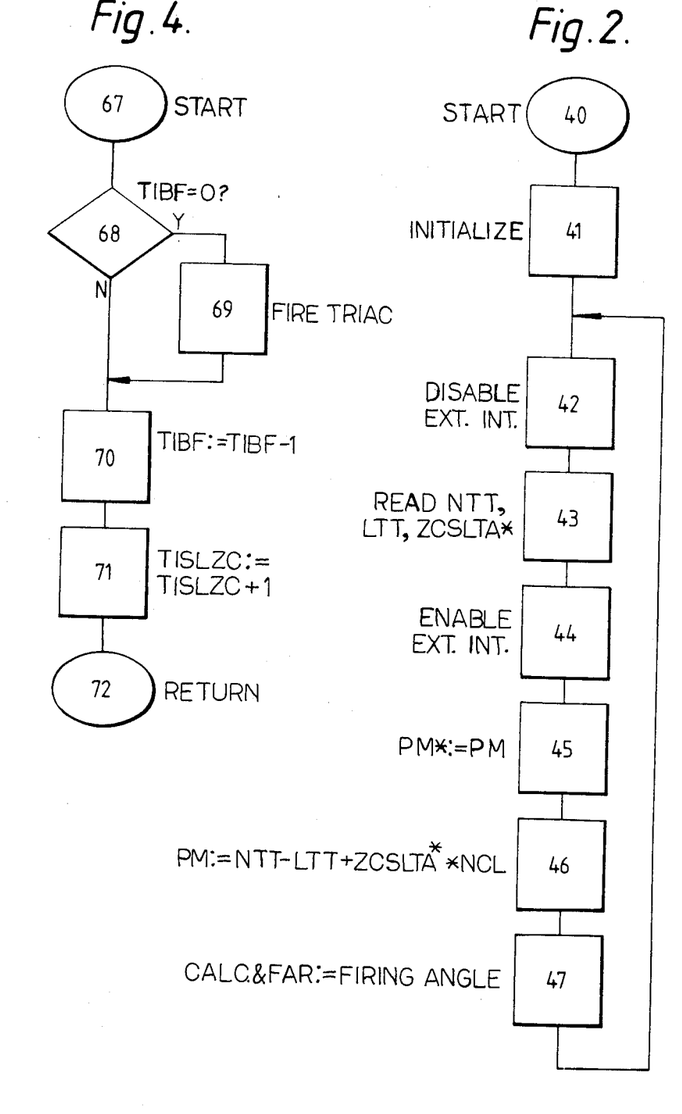
FIG. 2 is a flow chart of the main program executed by a microcomputer forming part of the embodiment of FIG. 1.
FIG. 4 is a flow chart of a second interrupt routine executed by the said microcomputer.

The overall system of FIG. 1 operates as follows, it being assumed, for example, that crystal resonator 12 is chosen to resonate at such a frequency that counter CT is clocked at a frequency such that there are between five and seven complete fill (cycle) periods for this counter in each half-cycle of the a.c. voltage applied to conductors 3 and 4. Program store 7 contains a cyclic main program which basically consists of a calculation routine for calculating the actual speed of the motor 1 as indicated by the period of the output pulses of the tachogenerator 11 and, from this and the target speed indicated by the content of the register PT, the firing angle for the triac 2 required in each half-cycle of the a.c. supply fed to the conductors 3 and 4. This calculation results in an eleven-bit digital number indicating the number of counts which counter CT should make after each zero crossing occurs in the a.c. supply before the triac is fired, which number is stored in the firing angle register FAR. The three most significant bits of this number indicate the number of complete cycles of counter CT required and the eight least significant bits indicate the additional fraction of a complete cycle which is required. Each time a new calculation has been effected the current content of register FAR is replaced by the new result. A digital number representing the period of the tachogenerator pulses and hence the actual speed of the motor is calculated from the contents of the registers LTT, NTT and ZCSLTA* and entered into the register PM, and each time this occurs the previous content of register PM is entered into another register PM*. Each calculation for the firing angle uses the current contents of the registers PM, PM* and PT as its input parameters; such calculations of required firing angle in dependence upon the actual and target speeds and the rate at which actual speed is changing are well-known, an example being given in United Kingdom patent specification No. 2102990. The cyclic main program is shown very diagrammatically in the flow chart of FIG. 2, in which the various blocks have the following significances:

40 - Start
41 - Initialize. Reset devices 21 and 24. Write target speed into register PT and zero into registers PM and PM*.
42 - Disable external interrupt.
43 - Read contents of new-tachogenerator-interrupt-time register NTT, last-tachogenerator-interrupt-time register LTT and saved-zero-crossings-since-last-tachogenerator-interrupt register ZCSLTA*.
44 - Enable external interrupt.
45 - Replace contents of register PM* by those of register PM. (PM*:=PM).
46 - Set content of tachogenerator period register PM to the difference between the contents of register NTT and register LTT read in step 43 plus the product of the content of register ZCSLTA* read in step 43 and the number NCL of output pulses of clock CL which correspond to each half-cycle of the a.c. supply applied across terminals 3 and 4. (PM:=NTT−LTT+ZCSLTA**NCL).
47 - Calculate firing angle from contents of registers PM, PM* and PT, and replace content of firing angle register FAR by the result.

Obviously further steps may be included in the loop if desired.

As far as step 46 is concerned, as will become evident below register NTT contains, at any given time, a representation in terms of a number of counts of counter CT of the time interval by which the last tachogenerator pulse lagged the zero-crossing in the a.c. supply which immediately preceded it. Similarly, register LTT contains a representation of a similar quantity relating to the preceding tachogenerator pulse. Moreover, register ZCSLTA* contains a representation of the number of zero-crossings (if any) which occurred between these two tachogenerator pulses. Thus the result of the calculation performed in step 46 is a representation, in terms of a number of counts of counter CT, of the time period elapsing between the two tachogenerator pulses (which period is inversely proportional to the speed of motor 1).

Figure 3:
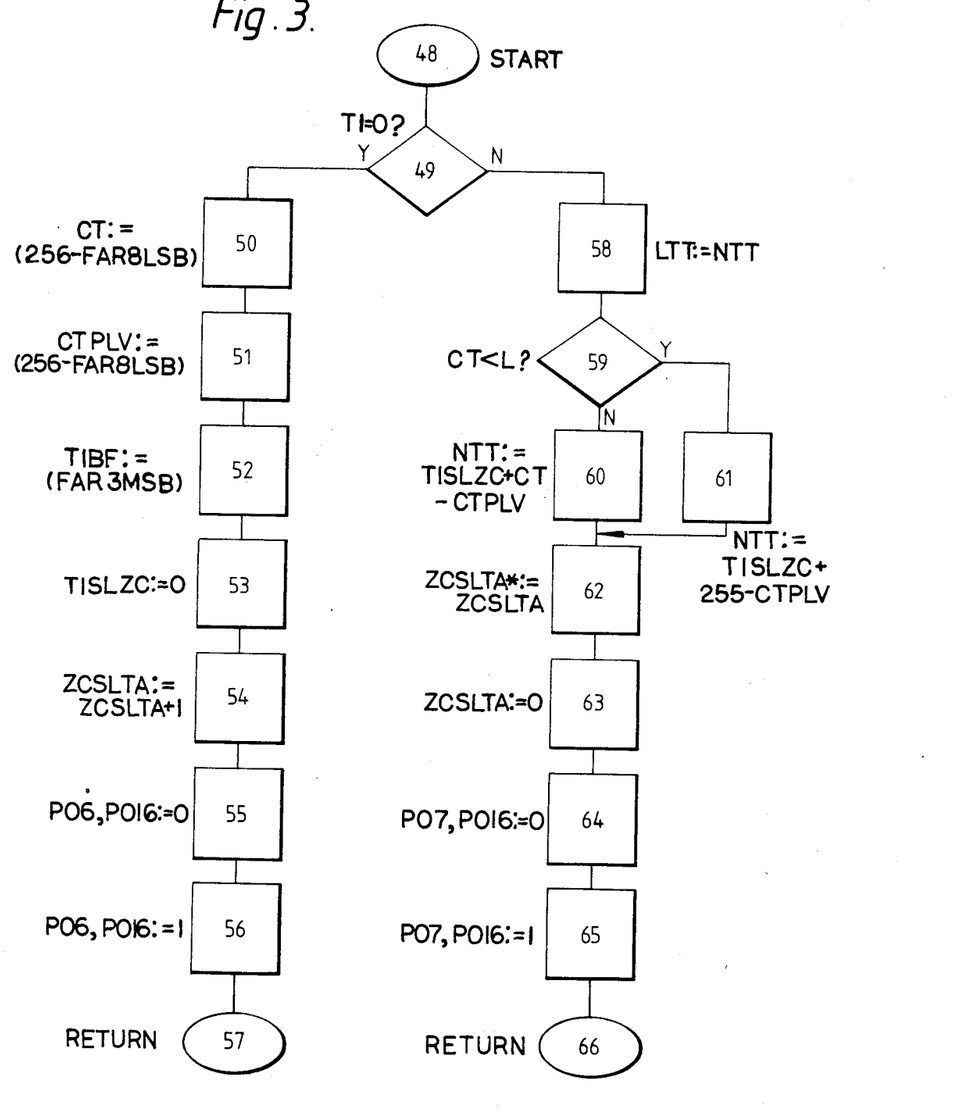
FIG. 3 is a flow chart of a first interrupt routine executed by the said microcomputer.

As indicated above, the cyclic main program is continuously repeated unless an interrupt occurs. Such an interrupt is generated either by a transition from logic "1" to logic "0" at the interrupt signal input $\overline{\text{INT}}$/T0 ("external interrupt") or by an overflow of timer/counter CT ("timer interrupt"). When an external interrupt occurs the interrupt routine shown in the flow chart of FIG. 3 is carried out. In FIG. 3 the various blocks have the following significances:

48 - Start
49 - Is test pin T1 logic "0"?
50 - Set counter CT to 256-complement of eight least-significant bits in firing angle register FAR. (CT:=(256-FAR8LSB)).
51 - Set content of counter-pre-loading-value register CTPLV to equal the 256-complement of the eight least-significant bits in firing angle register FAR. (CTPLV:=(256-FAR8LSB)).
52 - Set content of timer-interrupts-required-before-triac-firing register TIBF to equal the three most significant bits in firing angle register FAR. (TIBF:=FAR3MSB)
53 - Set content of timer-interrupts-since-last-zero-crossing register TISLZC to zero. (TISLZC:=0).
54 - Increment content of zero-crossings-since-last-tachogenerator-interrupt register ZCSLTA. (ZCSLTA:=ZCSLTA+1).
55 - Set output pins P06 and P016 to logic "0". (P06, P016:=0).
56 - Set output pins P06 and P016 to logic "1". (P06, P016:=1).
57 - Return.
58 - Set content of register LTT to equal the content of register NTT. (LTT:=NTT).
59 - Is content of counter CT less than predetermined amount L?
60 - Set content of new-tachogenerator-interrupt-time register NTT to equal the concatenated contents of register TISLZC and timer/counter CT (11-bit result) from which concatenated contents is subtracted the content of register CTPLV. (NTT:=TISLZC+CT−CTPLV).
61 - Set content of register NTT to equal the concatenated content of register TISLZC and 255 (11-bit result) from which result is subtracted the content of register CTPLV. (NTT:=TISLZC+255−CTPLV).
62 - Set content of register ZCSLTA* equal to the content of register ZCSLTA. (ZCSLTA*:=ZCSLTA).
63 - Set content of register ZCSLTA to zero. (ZCSLTA:=0).

64 - Set output pins P07 and P016 to logic "0". (P07, P016:=0).
65 - Set output pin P07 to logic "1". (P07, P016:=1).
66 - Return.

Thus, each time an external interrupt occurs pin T1 is first tested (step 49) to determine whether the interrupting device is the zero-crossing detector 10. If it is (branch "Y") the 8-bit counter CT and the register CTPLV are both set (steps 50 and 51) to the 256-complement of the eight least significant bits of the content of the firing angle register FAR which has previously been filled during the main program, as mentioned above. Moreover register TIBF is set in step 52 to the three most significant bits of the content of register FAR. In general triac 2 will be required to be fired a whole number N of cycles of counter CT plus a fraction of such a cycle after the zero-crossing instant, the contents of register FAR representing these quantities, as indicated above. Because of step 50 counter CT will next overflow (generating a timer interrupt) after the said fraction of such a cycle, and because of step 52 the content of register TIBF indicates at which subsequent such overflow (or the same one) the triac should be fired. As will be described with reference to FIG. 4, when each overflow and hence timer interrupt occurs the content of register TIBF is first tested to see if it is zero, after which it is decremented. If the result of the test is zero the triac is actually fired, thus achieving the correct firing instant. The quantity stored in step 51 is used when the tachogenerator 11 produces an external interrupt, as will be described below. A record is kept in register TISLZC of the number of timer interrupts which have occurred since the last zero-crossing (again for use when the tachogenerator produces an external interrupt); this is the reason for step 53. Moreover a record is kept in register ZCSLTA of the number of zero-crossings which have occurred since the last tachogenerator interrupt (again for use when the tachogenerator produces an interrupt); this is the reason for step 54. The logic "0" pulse generated on pin P06 by means of steps 55 and 56 resets the bistable device 21. The logic "0" pulse generated on pin P016 by means of steps 55 and 56 temporarily overrides the output signal of OR-function circuit 17, as described above, thereby producing a new transition from logic "1" to logic "0" at interrupt input $\overline{INT}$/TO if bistable device 24 should also be in the set state.

If it is determined in step 49 that the zero-crossing detector 10 is not the interrupting device, then the interrupting device must be the tachogenerator 11. In such a case branch "N" is carried out. More particularly, in step 58 the content of register NTT is transferred to register LTT. Then in step 59 it is tested whether the content of counter CT is less than a predetermined amount L. If it is not ("N") then in step 60 register NTT is filled with a quantity given by the concatenated contents of register TISLZC and counter CT less the content of register CTPLV. Because of step 53 and of the fact (as will be described with reference to FIG. 4) that the content of register TISLZC is incremented each time a timer interrupt occurs, at any given time the contents of register TISLZC indicate how many timer interrupts have occurred since the last zero-crossing. After the content of register CTPLV has been subtracted from them (to correct for the pre-loading of counter CT at the preceding zero-crossing) the concatenated contents of register TISLZC and counter CT therefore represent the number of clock pulses generated by clock CL since the last zero-crossing occurred, i.e. the time period between the immediately preceding zero-crossing and the current tachogenerator output pulse. This quantity is therefore entered into register NTT. Because of step 58, a corresponding quantity relating to the immediately preceding tachogenerator output pulse is already present in register LTT. The time (represented by a number of output pulses of clock CL) elapsing between these two tachogenerator output pulses (which is a measure of the current motor speed) is therefore given by the content of register NTT less the content of register LTT plus X times the number of output pulses of CL which corresponds to a complete half-cycle of the supply applied across terminals 3 and 4, where X is the number of zero-crossings which have occurred since the tachogenerator produced the preceding output pulse. Because of steps 54 and 63 the quantity X is contained in register ZCSLTA, this quantity being saved into register ZCSLTA* in step 62. Thus the registers NTT, LTT and ZCSLTA* contain the quantities required by step 46 in the main program. The logic "0" pulse generated on output pin P07 by means of steps 64 and 65 resets the bistable device 24. The logic "0" pulse generated on pin P016 by means of steps 64 and 65 temporarily overrides the output signal of OR-function circuit 17, as described above, thereby producing a new transition from logic "1" to logic "0" at interrupt input $\overline{INT}$/TO if bistable device 21 should also be in the set state. If the result of test 59 is yes ("Y") step 60 is replaced by step 61, the difference being that the quantity 255 is used in the calculation instead of the content of counter CT. This is because the relevant reading of counter CT will not follow the interrupt signal which gave rise to the relevant interrupt routine immediately, inter alia because the microcomputer 6 has first to store parameters to enable it to continue with its current program after the interrupt has been serviced, during which storage process the counter CT continues to count. The counter CT is thus read L counts after the interrupt signal occurs, where L may be of the order of ten, and thus the reading is too high by L. This does not normally matter, as it is the same for all readings. However, if the interrupt signal occurs just before, and within L counts of, an overflow of counter CT, what should be a reading of slightly more than the maximum count of counter CT will in fact be a reading of a very small number. This difficulty is overcome by replacing all readings of L or less by the maximum count of counter CT. This of course only gives an approximately correct result, but such approximation can be satisfactory provided that L is not too large.

If desired it can be arranged that, for example at relatively high motor speeds which will give rise to a comparatively high repetition rate of the output pulses of tachogenerator 11, steps 58–63 are performed only once for every Y output pulses of tachogenerator 11 where, for example, Y=16, thereby reducing the processing time overhead required by these steps. Obviously allowance will then have to be made in the calculation of the required triac firing angle that the quantities eventually entered into register PM will have Y times the values they would otherwise have. Steps 64–66 will, of course, still have to be performed for every tachogenerator output pulse.

As a modification to the flow-chart of FIG. 3 the setting of pin P016 to logic "0" and logic "1" respectively in steps 55 and 56 respectively may be omitted, this setting of pin P016 to logic "0" and then logic "1"

being carried out instead by means of further steps (not shown) after step 51. Similarly, the setting of pin P016 to logic "0" and logic "1" respectively in steps 59 and 60 may be omitted, this setting of pin P016 to logic "0" and then logic "1" being carried out instead by means of further steps (not shown) after step 60. However, this will increase the length of the routines, albeit by a small amount, which may be undesirable.

Each time the timer/counter CT overflows the timer interrupt routine shown in the flow chart of FIG. 4 is followed. In FIG. 4 the various blocks have the following significances:

67 - Start

68 - Is the content of timer-interrupts-before-firing register TIBF zero? (TIBF=O).

69 - Fire triac if the answer to test 67 is "yes".

70 - Decrement content of register TIBF. (TIBF:-=TIBF−1).

71 - Increment content of timer-interrupts-since-last-zero-crossing register TISLZC. (TISLZC:-=TISLZC+1).

72 - Return.

Because register TIBF is loaded in step 52 (FIG. 3) at each zero-crossing with the number of timer interrupts which should occur before the triac is actually fired, and is decremented (step 70) when each timer interrupt actually occurs, if when a given timer interrupt occurs the content of register TIBF is zero (test 68) then the triac should be fired immediately. This is accordingly done by means of step 69. As mentioned previously, a record is kept in register TISLZC of the number of timer interrupts which have occurred since the last zero-crossing (for use in steps 60 and 61 of FIG. 3). This is the reason for the incrementing of the contents of this register in step 71 (and for their resetting to zero in step 53 of FIG. 3). Obviously instead of decrementing register TIBF in step 71 and testing its contents for zero in step 68, step 71 may be omitted provided that test 68 is now a test on the contents of register TISLZC for equality with the contents of register TIBF.

It will be evident that several modifications are possible to the embodiment described. For example, it may be arranged that steps 43, 45, 46 and 47 of the main program are only performed if a tachogenerator interrupt has been generated and processed by means of steps 58-66 since steps 43-47 were last performed. (Otherwise the main program would be duplicating a previous calculation). To this end the branch of FIG. 3 containing the steps 58-66 may include an operation (not shown) of setting a flag, and the main program of FIG. 2 may include, after step 42, the steps (not shown) of testing and resetting this flag, the steps 43, 45, 46 and 47 only being performed if the flag is found to be set. As another example step 58 of FIG. 3 may be omitted if it is arranged that the results of the calculations carried out in step 60 (or 61) are written alternately into respective members of a pair of registers, a toggle being operated each time to indicate which register was last written and being tested in step 43 of FIG. 2 to indicate which register corresponds to NTT and which to LTT. As yet another example steps 43, 45 and 46 of the main program of FIG. 2 can be carried out instead in the interrupt branch containing steps 58-66 of FIG. 3, step 44 of FIG. 2 then being transferred to after step 47. However it is desirable to keep the times for which the external interrupts are disabled as short as possible and also to keep the interrupt routines themselves as short as possible so that there is as little disturbance as possible to the operations carried out in response to the external interrupts. In fact the operations 58-61 of FIG. 3 may themselves be performed in the main program, if they are replaced in FIG. 3 by the saving of the counter reading and the contents of the registers TISLZC and CTPLV for use in the main program.

If the capacity of counter CT is sufficient to ensure that its maximum cycle time is always longer than the time occupied by each half-cycle of the a.c. supply, so that its first overflow in each half-cycle can be arranged to occur anywhere in that half-cycle by suitably pre-loading it at the zero-crossing instant determining the start of that half-cycle, this overflow then always causing triac 2 to be fired, it will be evident that registers TIBF and TISLZC may be omitted, the various calculations and operations involving the contents of these regiters being suitably modified or omitted accordingly.

We claim:

1. A speed control system for an a.c. electric motor connected in series with a controllable switch between first and second a.c. supply voltage conductors, which system comprises:

a data processing system comprising a program store and a digital data process for for performing a program of processing operations on digital data in accordance with program data contained in said program store, means coupling an output of the processing system to a control input of said switch, a detector for generating an output signal when zero potential occurs between said supply conductors, which detector has an input coupled to said supply conductors and an output coupled to an input of said data processing system, a tachogenerator driven by said motor and having an output coupled to an interrupt signal input of said data processing system, and a counter having an input coupled to an output of a clock signal source and an output coupled to an interrupt signal input of said data processing system, for generating an output signal when the count therein reaches a predetermined value, said program comprising a cyclic main program and first and second interrupt routines arranged to be performed in response to the generation of an output signal by said tachogenerator and in response to the count in said counter reaching said predetermined value respectively, characterised in that the detector output is coupled to an interrupt signal input of said data processing systme, in that said program comprises a further interrupt routine arranged to be performed in response to the generation of an output signal by said detector, in that said data processing system includes first storage means for storing a digital representation, in terms of a number of counts of the counter, of the time after the generation of an interrupt signal by said detector at which the switch is required to conduct, second storage means for storing a digital representation of the number of output signals generated by said detector since a preceding tachogenerator output signal occurred, and third and fourth storage means each storing a digital representation of a respective time which elapsed between the generation of an output signal by the detector and the subsequent generation of an output signal by the tachogenerator, or for storing information from which this time can be calculated, the said further interrupt routine being arranged to (a) load the counter with a value derived from the first storage means such that the count therein will next reach said predetermined value when the switch is required to conduct, and (b) update the contents of the second storage means, wherein the said second interrupt routine (c) generates at the said output of the processing system of conduct control signal for the switch, wherein the said first interrupt routine, at lelast some times, (d) reads the contents of the counter and stores in one of the third and fourth storage means a digital representation, derived from the contents thus read and the value with which the counter was loaded when the immediately preceding output signal was generated by the detector, of the time which elapsed since the generation of an output signal by the detector, or of information from which this time can be calculated, so that thereafter one of the third and fourth storage means will have stored therein the result of said operation and the other of third and fourth storage means will have stored therein the result of the immediately preceding operation, and (e) saves and resets the contents of the second storage means, the main program, at least some times, being arranged to (f) calculates from the contents of the third and fourth storage means and the quantity saved in the last operation (e) the period of the output signals generated by the tachogenerator, (g) calculate from at least this period and a quantity representative of the required motor speed a quantity representative, in terms of a number of counts of the counter, of the time after the generation of an output signal by the detector at which the switch is required to conduct, and (h) store the calculated result in the first storage means.

2. A speed control system as claimed in claim 1, wherein the counter comprises a first portion arranged to generate an overflow signal at an output thereof which is coupled to the interrupt signal input of the data processing system, and a second portion including further storage means for a digital representation of the number of overflow output signals generated by the first portion since the last output signal generated by the detector occured, wherein the digital representation stored by the first storage means is arranged to be in terms of a whole number of complete cycle periods of said first portion plus a fraction of a second complete cycle period, wherein in operation (a) the first portion is loaded with a value such that it will next overflow after a period of time equal to the said fraction of a complete cycle period and the content of the further storage means is reset, and wherein the second interrupt routine constitutes a branch of a larger interrupt routine which is arranged to be performed in response to each overflow of the said first portion, which larger interrupt routine includes the initiation of the second interrupt routine if exactly said whole number of complete cycle periods of said first portion have occurred since the first overflow of said first portion after the last output signal wass generated by the detector, and updating the content of the further storage means.

3. A speed control system as claimed in claim 1, further comprising means coupling the outputs of said detector and said tachogenerator to the same interrupt signal input of said data processing system via an OR-function circuit for applying a first signal level to said interrupt signal input when the tachogenerator or the detector generates an output signal, whewrein the coupling means include respective first and second bistable devices each of which is arranged to be set to a first state in response to generation of its corresponding output signal, wherein the first bistable device has an output coupled to a further input of said data processor, wherein said data processor includes an output corresponding to each bistable device, which output is coupled to an input of the corresponding bistable device for resetting the corresponding bistable device to a second state in response to the generation of a reset signal at that output, wherein said program comprises an interrupt routine performed in response to a signal transition at said interrupt signal input from a second level to said first level, which interrupt routine comprises a test operation which tests whether the first bistable device is in its first state and first and second branches the first of which is performed if the result of said rest operation is positive and the second of which is performed otherwise, the versions of said interrupt routine which include the first and second branches constituting said further interrupt routine and said first interrupt routine respectively, wherein said OR-function circuit includes at least one override signal input so that said second signal level will be applied to said interrupt signal input when an override signal is present at any said override signal input whatever the states of said bistable devices, wherein said first branch includes the application of a reset signal to said first bistable device and the temporaray application of an override signal to a said override signal input for a period which terminates after the start of said application of a reset signal to said first bistable device, and wherein said second branch includes the application of a reset signal to said second bistable device and the temporary application of an override signal to a said override signal input for a period which terminates after the start of said application of a reset signal to said second bistable device.

4. A system as claimed in claim 3, wherein the application of a reset signal to said first bistable device also comprises the said temporary application of an override signal to a said override signal input for a period which terminates after the start of the said application of a reset signal to said first bistable device, and wherein the application of a reset signal to said second bistable device also comprises the said temporary application of an override signal to a said override signal input for a period which terminates after the start of the said application of a reset signal to said second bistable device.

5. A speed control system as claimed in claim 2, further comprising means coupling the outputs of said detector and said tachogenerator to the same interrupt signal input of said data processing system via an OR-function circuit for applying a first signal level to said interrupt signal input when the tachogenerator or the detector generates an output signal, wherein the coupling means include respective first and second bistable devices each of which is arranged to be set to a first state in response to generation of its corresponding output signal, wherein the first bistable device has an output coupled to a further input of said data processor, wherein said data processor includes an output corresponding to each bistable device, which output is coupled to an input of the corresponding bistable device for resetting the corresponding bistable device to a second state in response to the generation of a reset signal at that output, wherein said program comprises an interrupt routine performed in response to a signal transition at said interrupt signal input from a second level to said first level, which interrupt routine comprises a test operation which tests whether the first bistable device is in its first state and first and second branches the first of which is performed if the result of said test operation is positive and the second of which is performed otherwise, the versions of said interrupt routine which include the first and second branches constituting said further interrupt routine and said first interrupt routine respectively, wherein said OR-function circuit includes at least one override signal input so that said second signal level will be applied to said interrupt signal input when an override signal is present at any said override signal input whatever the states of said bistable devices, wherein said first branch includes the application of a reset signal to said first bistable device and the temporary application of an override signal to a said override signal input for a period which terminates after the start of said application of a reset signal to said first bistable device, and wherein said second branch includes the application of a reset signal to said second bistable device and the temporary application of an override signal to a said override signal input for a period which terminates after the start of said application of a reset signal to said second bistable device.

* * * * *